Patented Nov. 2, 1937

2,097,854

UNITED STATES PATENT OFFICE 2,097,854

CYCLOPENTADIENONE CONDENSATION COMPOUNDS AND PROCESS OF MAKING THEM

Walther Dilthey, Bonn-on-the-Rhine, Germany, assignor to I. G. Farbenindustrie Aktiengesellschaft, Frankfort - on - the - Main, Germany No Drawing. Application March 22, 1934, Serial No. 716,905. In Germany March 25, 1933

11 Claims. (Cl. 260—123)

The present invention relates to a process of condensing a cyclopentadienone compound with an unsaturated compound of the group consisting of ethylene and acetylene and substitution products thereof and to the products obtained thereby.

By the publications of Diels and Alder (compare U. S. Patent No. 1,944,731) it has become known that bodies containing a system of conjugated double bonds, i. e. so-called diene-compounds, are capable of combining with unsaturated substances of the ethylene- and acetylene series.

Now, I have found that cyclopentadienone compounds have the same capability of being added to unsaturated substances of the group consisting of ethylene and acetylene and substitution products thereof. As cyclopentadienone compounds there may be mentioned for instance those obtainable by condensing in an alkaline or acid medium in the presence or absence of a solvent, according to German Patent 575,857, aromatic o-diketones or derivatives or reduction products thereof with ketones or derivatives thereof which contain reactive methylene groups besides the carbonyl group. Thereby deeply colored cyclopentadienones are obtained. The addition of cyclopentadienones, for instance, of tetraphenylcyclopentadienone, to, for instance, maleic anhydride takes place according to the following scheme:

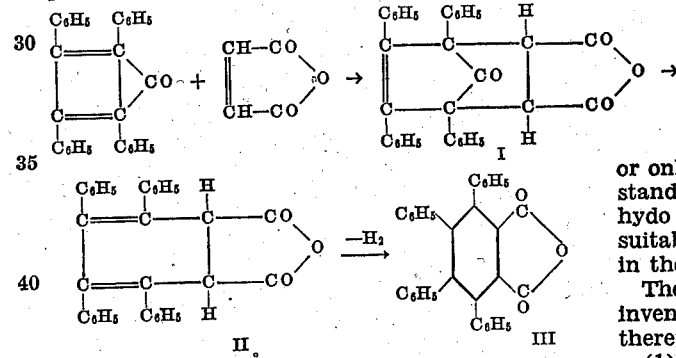

The endo-carbonyl body of Formula I is a colorless compound. By heating the maleic acid addition products, for instance, the body of the Formula I, in the presence or absence of a solvent, for instance, at 125° C.–150° C., carbon monoxide is split off and there is obtained the corresponding product which is free from CO, for instance, tetraphenyldihydrophthalic anhydride of the probable Formula II. By heating at a higher temperature, for instance, at about 200° C., the compound of Formula II is dehydrogenized with formation of tetra-phenylphthalic anhydride (Formula III). The temperatures at which carbon monoxide is split off differ in each case, as will be seen from the examples following hereafter.

According to this new process new products are obtainable, for instance, those of the following formula:

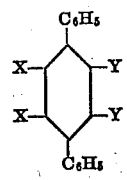

wherein X means phenyl or the two X's stand for the bivalent grouping

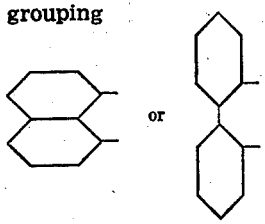

and wherein Y stands for phenyl or the two Y's stand for the bivalent grouping

or only one Y stands for phenyl and the other Y stands for a carboxylic acid or ester or an aldehydo group or aldehydo acetal group. They are suitable for being used as intermediate products in the manufacture of dyestuffs.

The following examples serve to illustrate the invention but they are not intended to limit it thereto:

(1) 1 mol. of tetra-phenylcyclopentadienone (melting at 218° C.) and 1 mol. of maleic anhydride are melted together at about 190° C.–200° C., whereby the mass soon loses its color with evolution of a gas. Heating is interrupted when the yellowish melt is at rest. The solidified mass is heated to boiling with water, washed for a short time in cold caustic soda solution and the solid residue is recrystallized from glacial acetic acid. There is obtained the tetra-phenylphthalic anhydride of Formula III in the form of colorless crystals melting at 290° C.–291° C.

The mother liquor contains small quantities of tetra-phenyl dihydrophthalic anhydride (Formula II), melting at 250° C.–252° C., which may be obtained in a quantitative yield by boiling molecular quantities of tetra-phenylcyclopentadienone and maleic anhydride in chlorobenzene solution until decolorization takes place.

(2) 1 mol. of tetra-phenylcyclopentadienone and 1 mol. of phenylacetylene are heated together at about 160° C. After a short time the violet solution becomes light yellow and a gas is evolved. When evolution of gas ceases, heating is interrupted, the mass is purified by means of methanol and crystallized from a mixture of chloroform and methanol. There is thus obtained the penta-phenylbenzene in the form of colorless needles melting at 246° C.–247° C.

(3) 1 mol. of tetra-phenylcyclopentadienone and 1 mol. of tolane (diphenylacetylene) are mixed together and the mixture is heated to 225° C., whereby the mass fuses. The melt soon solidifies again with evolution of carbon monoxide. In order to obtain an entirely colorless melt the temperature is raised to 325° C. The hexaphenylbenzene thus obtainable is scarcely soluble in most solvents. From toluene, xylene and nitrobenzene it may be obtained in the form of colorless crystals which melt at 421° C.–422° C. partly with sublimation.

(4) 1 mol. of tetra-phenylcyclopentadienone and 1 mol. of stilbene (diphenylethylene) are heated together for a prolonged time at about 305° C. After cooling the brown melt thus obtained is recrystallized several times from glacial acetic acid or a mixture of benzene and methanol. There is obtained the hexaphenyldihydrobenzene in the form of colorless crystals melting at 179° C.–180° C.

This hexaphenyldihydrobenzene may be converted into hexaphenylbenzene melting at 421° C.–422° C. by heating the dihydro derivative with zinc dust or, advantageously, with selenium.

(5) 1 mol. of diphenylene-diphenylcyclopentadienone, 1 mol. of maleic anhydride and about 10 times the weight of nitrobenzene are heated together to gentle boiling. Decolorization and solution take place slowly. After boiling gently for some hours, the whole is allowed to cool; thereby a product separates in the form of small feebly yellow crystalline laminae melting at 345° C.–346° C. It may be supposed to be the diphenylene-diphenylphthalic anhydride of the probable constitution:

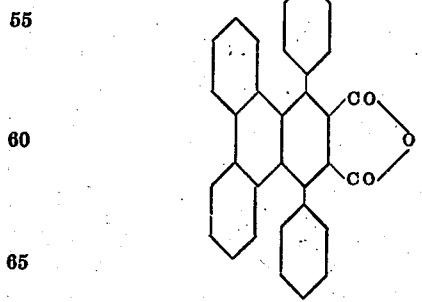

(6) 25 parts by weight of the condensation product from acenaphthenequinone and dibenzylketone of the following formula:

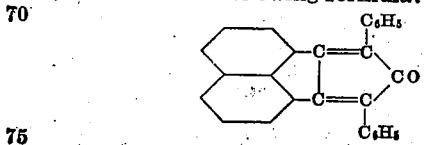

are mixed with 14 parts by weight of diphenylacetylene and the mixture is melted at a temperature of about 230° C. The mass slowly decolorizes with evolution of a gas and finally solidifies again to a grey product. It is then heated for a short time at about 300° C. The cold crude product is purified by heating it to 60–70° C. with 8–10 times its weight of concentrated sulfuric acid and stirred at this temperature until the color of the solution thus obtained no longer changes. The sulfuric acid solution is poured on ice whereby the reaction product is precipitated in the form of a yellowish crystalline mass. By recrystallization from benzene there are obtained colorless needles melting at 315° C.–317° C. The solution on benzene shows a bluish fluorescence. The product may be supposed to be the tetraphenylfluoranthene of the formula:

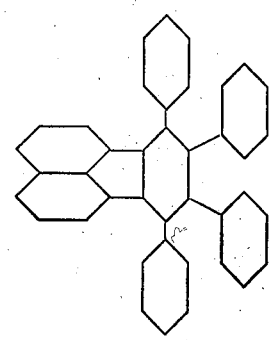

(7) 7.5 parts by weight of tetra-phenylcyclopentadienone and 4 parts by weight of phenylpropiolic ethylester are heated to boiling in about 25 parts by volume of nitrobenzene. Solution and decolorization take place slowly. On cooling, about 9 parts by weight of pentaphenylbenzoic acid ethylester crystallize in the form of small white crystalline laminae. They melt at 320–322° C.

(8) By heating equimolecular quantities of tetraphenylcyclopentadienone and of the acetal of phenylpropiolaldehyde dissolved together in trichlorobenzene for some time at about 200° C., decolorization takes place slowly with evolution of carbon monoxide. On cooling, pentaphenylbenzaldehyde-acetal crystallizes in the form of colorless laminae melting at 286° C. By boiling it with glacial acetic acid it is transformed into the pentaphenylbenzaldehyde of the formula:

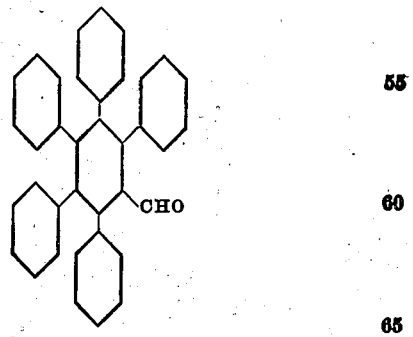

it forms white laminae which melt sharply at 263.5° C.

(9) Tetraphenylcyclopentadienone in a solution of naphthalene is treated with acetylene at a temperature between 150° C. and 180° C. until the originally red color of the solution has disappeared. There is easily obtained the tetraphenylbenzene which crystallizes from glacial acetic acid in the form of colorless needles melting at 190° C.

I claim:
1. The process which comprises heating a cyclopentadienone with a compound of the group consisting of unsaturated compounds of the ethylene and acetylene series.
2. The process which comprises heating cyclopentadienone wherein all hydrogen atoms are substituted by aromatic radicals, with a compound of the group consisting of unsaturated compounds of the ethylene and acetylene series.
3. The process which comprises heating a cyclopentadienone with a compound of the group consisting of maleic acid anhydride, phenyl acetylene, diphenyl acetylene, diphenyl ethylene, phenyl propiolic acid ethyl ester, acetal of phenyl propionaldehyde and acetylene.
4. The process which comprises heating cyclopentadienone wherein all hydrogen atoms are substituted by aromatic radicals with a compound of the group consisting of maleic acid anhydride, phenyl acetylene, diphenyl acetylene, diphenyl ethylene, phenyl propiolic acid ethyl ester, acetal of phenyl propionaldehyde and acetylene.
5. The process which comprises heating at about 190° C. to about 200° C. tetraphenylcyclopentadienone together with maleic anhydride until the melt thus obtained is at rest.
6. The compounds of the formula:

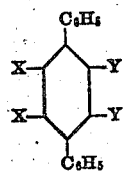

wherein the grouping

is selected from the class consisting of

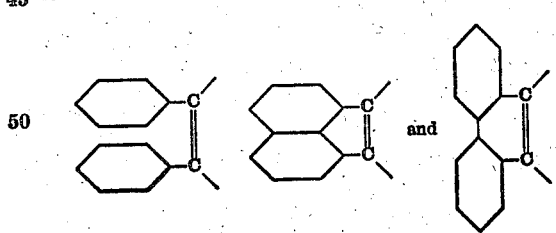

and wherein the grouping

is selected from the class consisting of

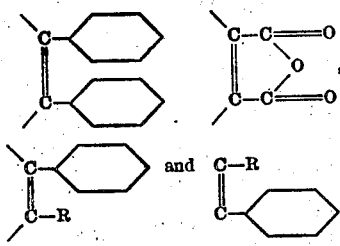

R being a member of the group consisting of carboxylic acid and carboxylic acid ester groups.
7. The process which comprises heating at about 230° C. a mixture of diphenylacetylene and a compound of the formula:

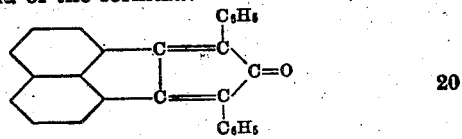

until the melt thus obtained is decolorized.
8. The process which comprises boiling a mixture of tetraphenylcyclopentadienone and phenylpropiolic acid ethylester in nitrobenzene until a decolorized solution has been obtained.
9. The compound of the formula:

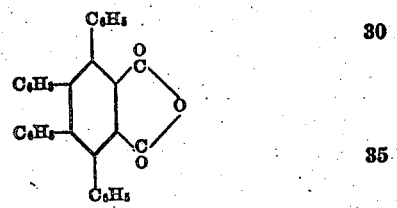

forming colorless crystals melting at 290° C.–291° C.
10. The compound of the formula:

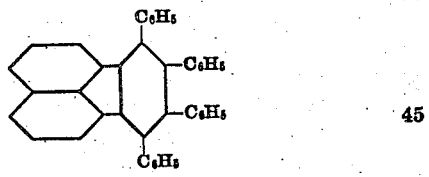

forming colorless needles melting at 315° C.–317° C. and dissolving in benzene to a solution showing a bluish fluorescence.
11. The compound of the formula:

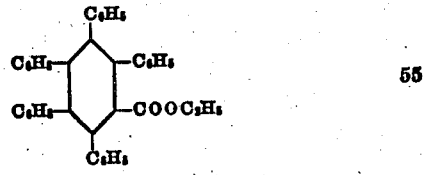

forming white small crystalline laminae, melting at 320° C.–322° C.

WALTHER DILTHEY.